US006718358B1

(12) United States Patent
Bigus et al.

(10) Patent No.: US 6,718,358 B1
(45) Date of Patent: Apr. 6, 2004

(54) SYSTEM AND METHOD FOR GENERIC AUTOMATED TUNING FOR PERFORMANCE MANAGEMENT

(75) Inventors: Joseph Phillip Bigus, Rochester, MN (US); Joseph L. Hellerstein, Ossining, NY (US); Mark S. Squillante, Pound Ridge, NY (US); Jayram S. Thathachar, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/541,368

(22) Filed: Mar. 31, 2000

(51) Int. Cl.$^7$ ................................................. G06F 9/00
(52) U.S. Cl. ........................................ 709/100; 706/10
(58) Field of Search .................. 706/10–12, 21–25; 709/100, 104–106, 220–229

(56) References Cited

U.S. PATENT DOCUMENTS

| | | | |
|---|---|---|---|
| 5,444,820 A | | 8/1995 | Tzes et al. |
| 5,461,699 A | | 10/1995 | Arbabi et al. |
| 5,745,652 A | | 4/1998 | Bigus |
| 5,784,702 A | * | 7/1998 | Greenstein et al. |
| 5,819,033 A | * | 10/1998 | Caccavale ................ 709/224 |
| 5,893,905 A | | 4/1999 | Main et al. |
| 6,505,244 B1 | * | 1/2003 | Natarajan et al. ........... 709/223 |

OTHER PUBLICATIONS

T. Abdelzaher et al., "End–Host Architecture for QoS––Adaptive Communication," IEEE Real–Time Technology and Applications Symposium, Denver, Colorado, 10 pages, Jun. 1998.

J. Aman et al., "Adaptive Algorithms for Managing a Distributed Data Processing Workload," IBM Systems Journal, vol. 36, No. 2, pp. 242–283, 1997.

J.L. Hellerstein et al., "An Approach to Predictive Detection for Service Management," Symposium on Integrated Network Management, pp. 309–322, 1999.

* cited by examiner

*Primary Examiner*—Zarni Maung
*Assistant Examiner*—G. L. Opie
(74) *Attorney, Agent, or Firm*—Gail H. Zarick; Ryan, Mason & Lewis, LLP

(57) ABSTRACT

A system and method is described for generic automated tuning for performance management. The system comprises a target to be controlled and a generic automated tuning agent (GATA) that performs this control. The controlled target provides interfaces to metrics relating to workload, service levels, and configuration information, as well as a means to adjust tuning controls that determine resource allocations within the target. The GATA inputs the metrics, estimates new tuning control settings based on service objectives specified by administrators, and outputs the tuning control settings.

50 Claims, 9 Drawing Sheets

SYSTEM AND METHOD FOR GENERIC AUTOMATED TUNING FOR PERFORMANCE MANAGEMENT

FIELD OF THE INVENTION

The present invention relates generally to the performance of networked systems and, more particularly, to automated techniques for improving the performance of networked systems.

BACKGROUND OF THE INVENTION

There has been a tremendous growth in the complexity of distributed and networked systems in the past few years. In large part, this can be attributed to the exploitation of client-server architectures and other paradigms of distributed computing.

Our interest is in automated techniques for improving the performance of heterogeneous distributed systems. Such systems are comprised of a variety of components including: computing elements, operating systems within the computing elements, middleware that links together computing elements, and applications that span computing elements. Herein, we use the term "target" to refer to the system, subsystem, or element that is being manipulated to improve its performance.

An initial question may be raised such as "why not solve performance problems by using more hardware, such as faster processors and more memory?" Sometimes, this is effective, at least up to the point where cost becomes a major issue. However, applying this approach in practice requires identifying resource bottlenecks, which requires some thought. Also, more hardware typically does not resolve logical bottlenecks, such as those due to locking or improper settings of task priorities.

The concept of "tuning" seeks to improve service levels by adjusting existing resource allocations. Doing so requires access to metrics and to the controls that determine resource allocations. In general, there are three classes of metrics: (1) "configuration metrics" that describe performance related features of the target that are not changed by adjusting tuning controls, such as line speeds, processor speeds, and memory sizes; (2) "workload metrics" that characterize the load on the target, such as arrival rates and service times; and (3) "service level metrics" that characterize the performance delivered, such as response times, queue lengths, and throughputs.

"Tuning controls" are parameters that adjust target resource allocations and hence change the target's performance characteristics. We give a few examples. Lotus Notes, an e-mail system and application framework, has a large set of controls. Among these are: NSF_BufferPoolSize for managing memory, Server_MaxSessions for controlling admission to the server, and Server_SessionTimeout for regulating the number of idle users. In Web-based applications that support differentiated services, there are tuning controls that determine routing fractions by service class and server type. MQ Series, a reliable transport mechanism in distributed systems, has controls for storage allocations and assigning priorities. Database products (e.g., IBM's DB/2) expose controls for sort indices and allocating buffer pool sizes.

To determine the effect of tuning adjustments, there must be a model that relates workload levels and the settings of tuning controls to the service levels that will be achieved. We refer to this as the target's system model, or just "system model." It is difficult to acquire and maintain a system model, especially since application software can change dramatically from release to release (even between patch levels). Thus, system models are usually informal and imprecise.

In the existing art, tuning typically involves the following steps: (1) collect data; (2) use the system model to determine how tuning controls should be adjusted; and (3) goto step (1).

There are many challenges here. First, as noted previously, acquiring and maintaining the system model is difficult. Second, the controls are complex and often impact service levels in nonlinear ways. This makes it challenging to select the tuning controls to adjust as well as to determine what the settings of these controls should be. Third, the above scenario only considers current workloads. It may well be that by the time the tuning controls are adjusted, the workload will have changed so that new adjustments are necessary.

Because the expertise required for manual tuning is scarce, many have pursued an automated approach. A variety of target-specific or "customized automated tuning systems" (CATS) have been developed. Examples include systems by: (1) Abdelzaher and Shin, as described in "End-host Architecture for QoS-Adaptive Communication," IEEE Real-Time Technology and Applications Symposium, Denver, Colo., June 1998, the disclosure of which is incorporated by reference herein, who control quality of service for the delivery of multimedia using task priorities in the communications subsystem; and (2) Aman et al., as described in "Adaptive algorithms for managing a distributed data processing workload," IBM Systems Journal, Vol. 36, No 2, 1997, the disclosure of which is incorporated by reference herein, who provide a means by which administrators specify response time and throughput goals to achieve in MVS (Multiple Virtual Storage) systems using MVS-specific mechanisms to achieve these goals.

CATS require that metrics and tuning controls be identified in advance so that mechanisms for their interpretation and adjustment can be incorporated into the automated tuning system. Thus, CATS construction and maintenance still require considerable expertise. With the advent of the Internet, software systems and their components evolve rapidly, as do the workloads that they process. Thus, it may well be that automated tuning systems must be updated on a rate approaching that at which tuning occurs. Under such circumstances, the value of automated tuning is severely diminished.

Since customized automated tuning systems are difficult to build and maintain, it would be highly desirable to have a generic automated tuning system. Thus, instead of requiring experts to incorporate detailed knowledge of the target, such a generic automated tuning system may learn the target's performance characteristics. This may include having such a generic automated tuning system exploit prior knowledge of the target system, when such knowledge is available, reliable, and durable. As will be explained herein, the present invention provides such a generic automated tuning system and methodology.

As will be further explained in accordance with the present invention, a starting point in building such a generic automated tuning system is to construct a generic system model. Prior art in learning system models has largely focused on neural network approaches such as those in U.S. Pat. Nos. 5,893,905 to Main et al.; 5,461,699 to Arbabi and Fischthal; and 5,444,820 to Tzes and Tsotras, the disclosures of which are incorporated by reference herein. More related to objectives of the present invention is the work in U.S. Pat. No. 5,745,652 to Bigus, the disclosure of which is incorporated by reference herein, that describes a target-independent approach to automated tuning. This is accomplished by having a neural network that is trained off-line to learn the system model. In on-line operation, the system model is used in combination with a second neural network, the controller, to learn control actions.

The foregoing address two issues associated with constructing a generic automated tuning system, as is provided in accordance with the present invention: the generic system model and tuning control estimation. However, as will be explained, many other considerations are necessary as well.

First, existing art for target-independent automated tuning does not consider architectural support for access to the metrics and controls. Realizing generic, automated tuning requires well defined interfaces so that a generic automated tuning system can access the data required from the target. Previous work has ignored these considerations.

Second, the search for appropriate settings of tuning controls is facilitated by exposing information about the semantics of metrics and the operation of tuning controls. In particular, it is helpful for the target to place metrics into the categories of configuration, workload, and service level. These designations can aid the construction of a generic system model. Further, there should be a way to express the directional effects of tuning control adjustments since having such knowledge reduces the complexity of the search for appropriate settings of tuning controls. Past work has not focused on these concerns.

Third, the system model can be constructed using various learning approaches that enable different control algorithms to be employed. Prior work on automated tuning has largely focused on learning the system model using neural networks. It has not addressed other approaches that learn whether the system model falls into known classes of system models and then employ known effective controllers for such classes.

Fourth, one motivation for generic, adaptive tuning is that the system itself may change over time. This goes beyond the considerations discussed in Bigus in that we must detect changes and adjust the system model as well as retrain the controller. Prior art has not addressed these issues.

Lastly, it is well known in control theory that delays in the feedback loop in combination with "noise" (e.g., variable workloads) severely limit the controllability of a system. These limitations can, in part, be overcome in automated tuning if there are reasonably accurate models for forecasting load. Prior work such as in Hellerstein, Zhang, and Shahabuddin, "An Approach to Predictive Detection for. Service Management," Symposium on Integrated Network Management, 1999, the disclosure of which is incorporated by reference herein, suggests that forecasting workloads is an achievable task, at least in some networked environments. However, to date, there has been no attempt to incorporate forecasting models into an automated tuning system.

SUMMARY OF THE INVENTION

The present invention provides systems and methodologies for adaptively tuning heterogeneous distributed systems and their components. In one aspect of the present invention, an architecture is provided for a generic automated tuning agent (referred to herein as a GATA), as well as the GATA enablements required by the target system. In another aspect of the present invention, a methodology is provided for incorporating prior knowledge of the target system, as well as for learning verifiable properties about the target system, that can aid in the construction of a generic system model. In yet another aspect of the present invention, an automated tuning process is provided that: (a) takes into account changes in the target's system model; and (b) exploits workload forecasting models.

The architecture of the present invention includes components for metric access, tuning control manipulation, administrative access, and a generic controller that determines the settings of tuning controls. In a preferred embodiment, the generic controller has components for change-point detection, system model construction and execution, and workload model construction and execution. The enabled target system, which we refer to as the controlled target, provides interfaces for access to workload, service level, and configuration metrics, as well as a mechanism to adjust tuning controls.

In accordance with the present invention, the target system is enabled by providing interfaces to metrics and tuning controls. Both interfaces expose meta data. The metrics meta data provides, among other things, a means to classify the metric as configuration, workload, or service level indicators. For the tuning controls, the interface may indicate how service classes are affected by directional changes in specific controls. It is to be understood that these descriptions are not prerequisites to the operation of generic automated tuning. However, when present, these descriptions provide a means for generic automated tuning to operate more efficiently.

In addition, the present invention provides a method and a system for detecting changes in the target's system model and to incorporate workload forecasting information. In one embodiment, the method comprises the steps of: (1) waiting for data; (2) if no system model is present or if a system model change-point has been detected, invalidating the current system model, and constructing a new system model or switching to a previously constructed system model, and if insufficient data is available to construct a new model, going to step (1); (3) if no workload forecast model is present or a workload model change-point has been detected, invalidating the current workload forecast model and constructing a new one, and if insufficient data is available to construct a new model, going to step (1); (4) selecting new settings of tuning controls by using the system model (at least implicitly) to evaluate settings of tuning controls that improve forecast values of service level metrics based on forecast values of workload metrics; and (5) going to step (1).

The present invention provides numerous benefits not present in the existing art. Some examples of such benefits are provided. First, although existing art describes attempts to provide means for target-independent control, the architectural considerations for generic automated tuning have not been addressed, especially considerations such as access to metrics and tuning controls. Without these capabilities, generic automated tuning systems cannot be built.

Second, existing art in the area of generic control does not provide a means to express prior knowledge of the target, especially its metrics and tuning controls. This knowledge is invaluable in terms of achieving service levels that are closer to the optimal in a shorter time frame.

Third, prior work has focused on specific approaches, such as neural networks, to generic automated tuning. The present invention is designed to support a spectrum of approaches to generic automated tuning, which ranges from learning an effective controller for the target system (assuming no knowledge about the target) through employing a known effective controller based on verifiable properties about the target system.

Fourth, existing art for automated tuning does not detect changes in the system model nor does the existing art indicate how to update the system model if it changes. Such capabilities are essential to adapt in dynamic environments.

Lastly, prior work in automated tuning does not incorporate workload forecast models into the automated tuning system. Incorporating such models can greatly improve the quality of service delivered, as well as reduce the variance of the service levels achieved by anticipating future target loadings, a consideration that is especially important when there are delays in the feedback loop.

In addition, we note that the present invention may be applied to distributed systems in the following way. First, a target may in fact be distributed. So, metrics may be extracted from multiple components and tuning controls on multiple components may be manipulated. Second, the target may be another GATA. This provides a means for hierarchical control.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

The present invention will be explained below in the context of an illustrative system architecture. However, it is to be understood that the present invention is not limited to any particular system architecture or application to a particular type of target. Rather, the invention is more generally applicable to any system architecture and application to any target in which it is desirable for the system to automatically tune the target in order to improve the performance of the target.

Figure 1:
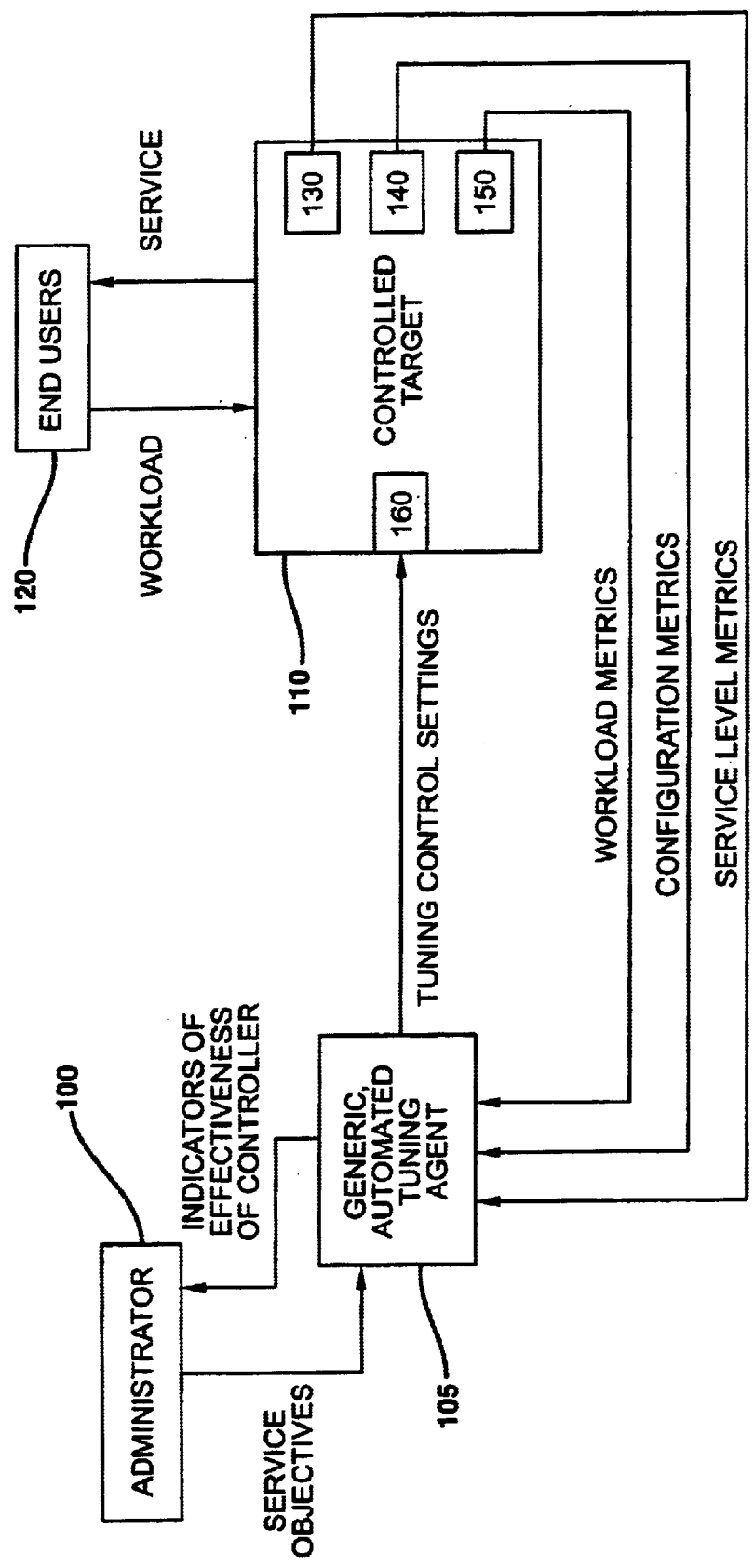
FIG. 1 is a block diagram illustrating an overview of one embodiment of the present invention.

Referring now to FIG. 1, a block diagram is shown illustrating an overview of one embodiment of the present invention. As shown, end-users 120 issue workload requests to a target system within the controlled target 110 and receive service in return. A generic automated tuning agent or GATA 105 interacts with the controlled target 110 to improve the performance of the target system in accordance with service objectives specified by an administrator 100. The controlled target exposes workload metrics 150, configuration metrics 140, and service level metrics 130 that are processed by the GATA to determine new settings of tuning controls 160. It is to be appreciated that the metrics and tuning controls may have delays associated therewith since there is likely some implicit lead time for the metrics to be exposed and the tuning controls to take affect. The specific components and operations of the GATA 105 and the controlled target 110 will be explained in detail below.

Figure 2:
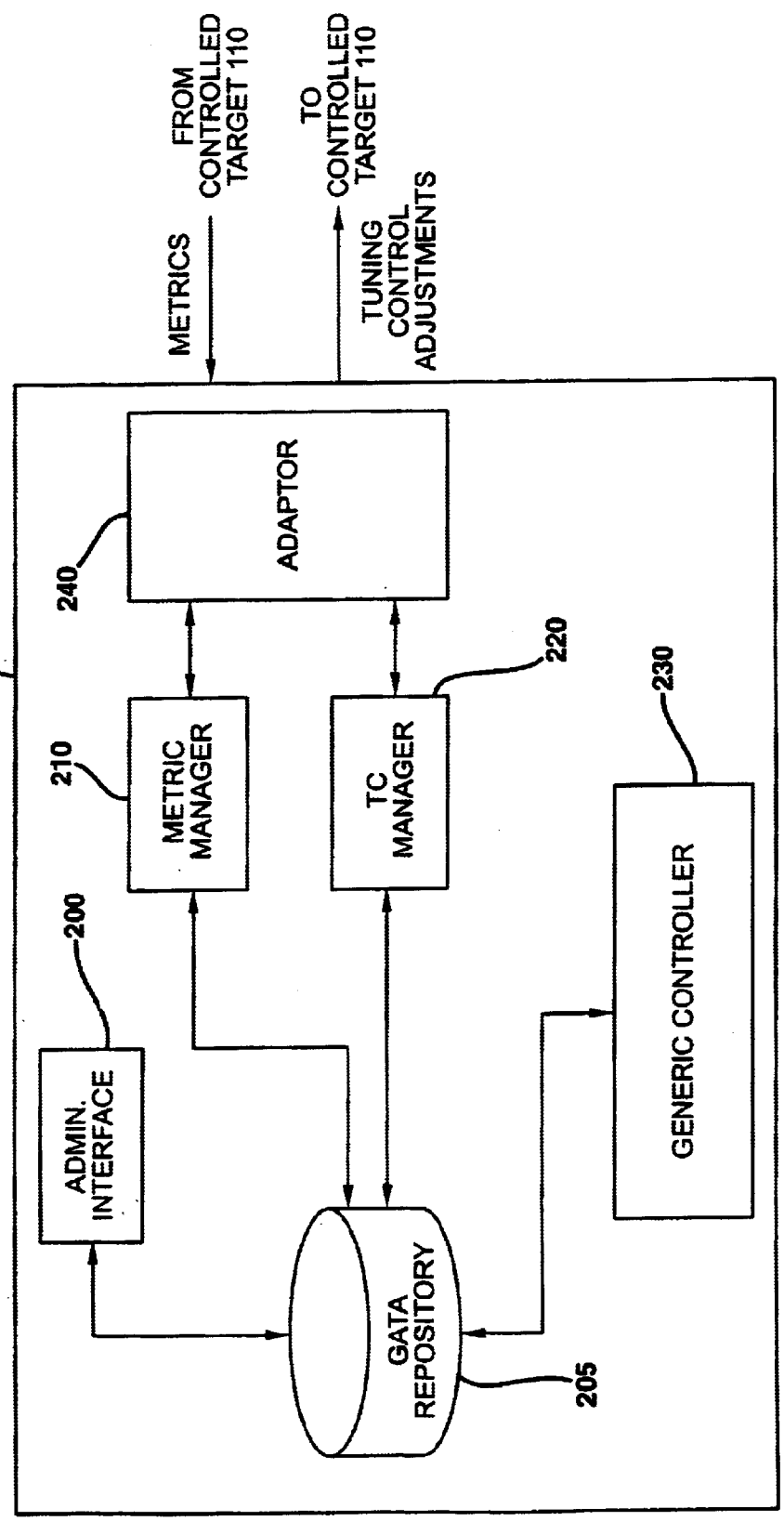
FIG. 2 is a block diagram illustrating components of a generic automated tuning agent according to one embodiment of the present invention.

Referring to FIG. 2, a block diagram illustrating components of a GATA according to one embodiment of the present invention is shown. The GATA 105 comprises administrative interface 200, a GATA storage repository 205, a metric manager 210, a tuning control (TC) manager 220, a generic controller 230 and an adaptor 240. The administrative interface 200 provides a means for administrators (such as administrator 100 in FIG. 1) to input commands and receive reports. This information is input to and extracted from the GATA repository 205. In addition to synchronous access (e.g., through database operations), the repository also supports a publish and subscribe interface. The adaptor 240 provides a means for interfacing with metrics and tuning controls from different target systems and thus has target system-dependent components (e.g., based on specific programmatic interfaces associated with the particular target system). The adaptor exposes a target system-independent interface to the metric manager 210 and the TC manager 220, which respectively handle metrics and tuning controls. These components provide information to and extract information from the GATA repository. The generic controller 230 subscribes to changes in metric values and uses this information to compute control actions. These actions are recorded in the repository. The TC manager subscribes to changes in tuning controls, which it then acts on.

Figure 3:
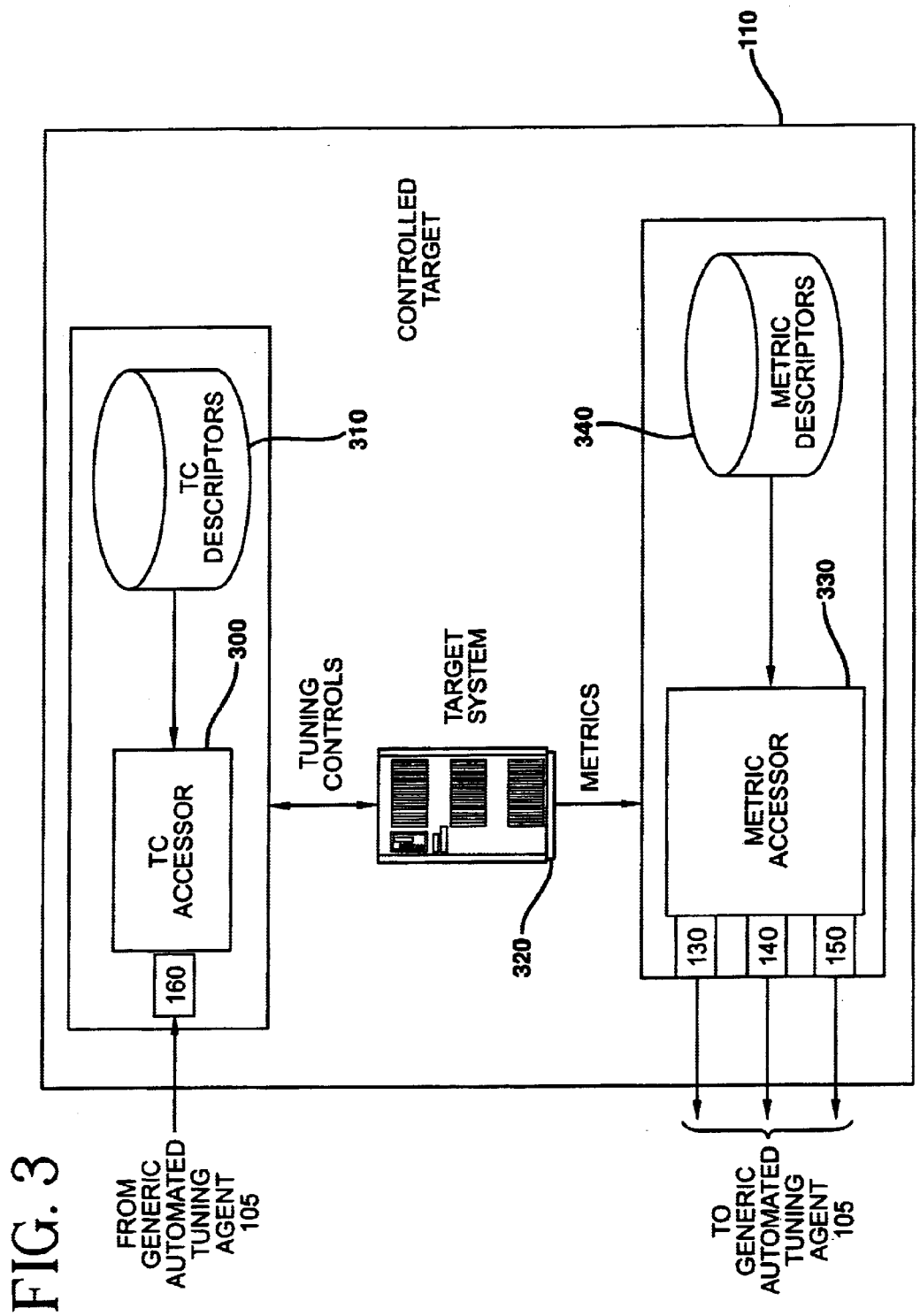
FIG. 3 is a block diagram illustrating components of a controlled target according to one embodiment of the present invention.

Referring to FIG. 3, a block diagram illustrating components of a controlled target according to one embodiment of the present invention is shown. Specifically, FIG. 2 shows the target system with the GATA enablements, i.e., controlled target-based components associated with the GATA. As shown, the controlled target 110 comprises a tuning control (TC) accessor 300, TC descriptors storage 310, the target system 320 (i.e., the target that is being automatically tuned), a metric accessor 330 and metric descriptors storage 340. The TC accessor 300 provides an interface to tuning controls along with meta data (i.e., the TC descriptors in storage 310) that describe these controls, such as valid settings. The metric accessor 330 provides access to metrics along with meta data (i.e., the metric descriptors in storage 340), such as the metric units.

Figure 4:
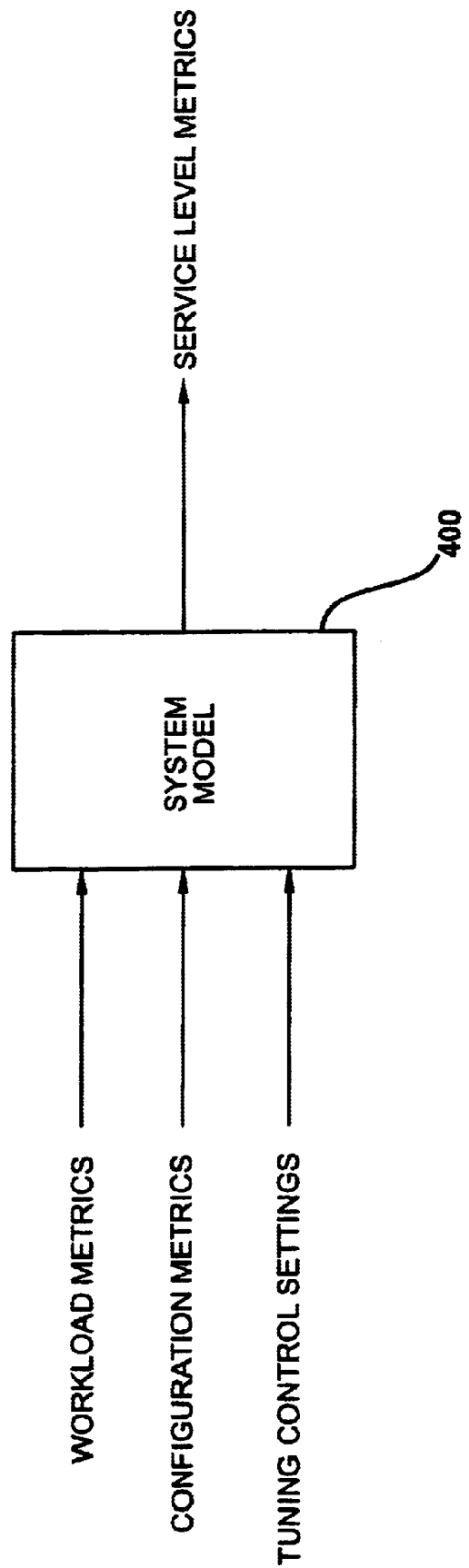
FIG. 4 is a diagram illustrating a system model according to one embodiment of the present invention.

FIG. 4 shows the inputs and outputs of a system model. The inputs are workload and configuration metrics and settings of tuning controls. The model uses this information to compute values of service level metrics. One embodiment of a GATA is to select a system model from one of many known system models, the correct one being chosen based on the current knowledge of appropriate parameters, and employing a known optimum controller for the chosen system model.

Figure 5:
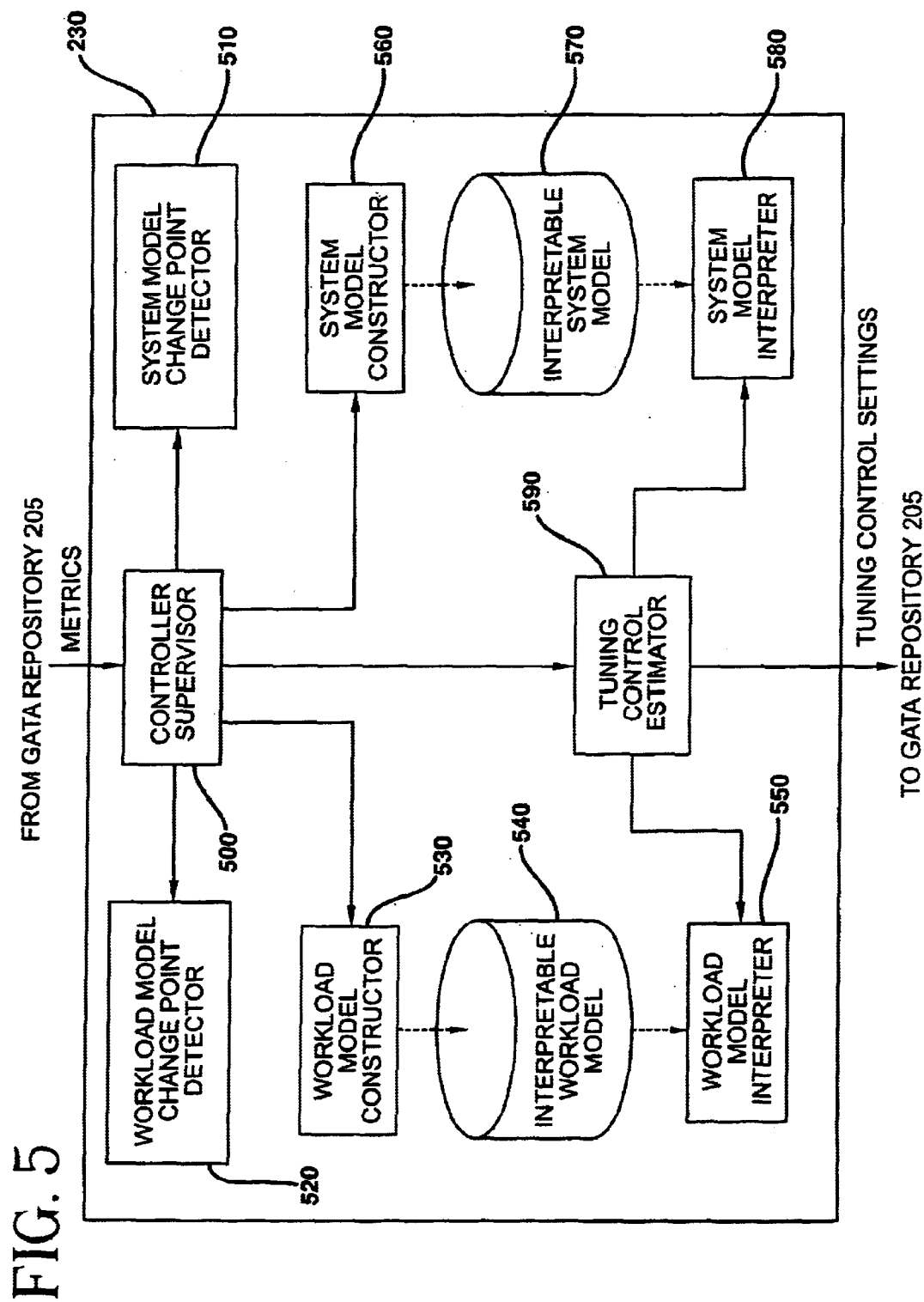
FIG. 5 is a block diagram illustrating elements of a generic controller according to one embodiment of the present invention.

Referring now to FIG. 5, a block diagram illustrating elements of a generic controller according to one embodiment of the present invention is shown. The generic controller 230 of the GATA 105 comprises a controller supervisor 500, a system model change point detector 510, a workload change point detector 520, a workload model constructor 530, interpretable workload model storage 540, a workload model interpreter 550, a system model constructor 560, interpretable system model storage 570, a system model interpreter 580 and a tuning control estimator 590. The operations of these modules will now be explained.

The controller supervisor 500 inputs metrics that are used by the workload model change point detector 520 to detect changes in the workload model and by the system model change point detector 510 to detect changes in the system model. The detectors may also detect when a previously constructed model is no longer valid. The workload model constructor 530 builds a workload model based on historical data. The system model constructor 560 does the same for the system model. In both cases, the result is an interpretable model 540 and 570, respectively, that is interpreted by another component. For workload, this is the workload model interpreter 550. For the system model, this is the system model interpreter 580. An example of an interpretable workload model is the set of parameters used in a workload model such as in the above-referenced article by Hellerstein, Zhang, and Shahabuddin (e.g., the parameter values for time-of-day, day-of-week, and monthly effects). The workload model interpreter may also forecast changes in the workload. An example of an interpretable system model is the service times and arrival rates for an M/M/1 queuing system. An M/M/1 queuing system comprises of a single server with a single queue. Jobs arrive at the server according to a Poisson process and get queued before they can be served. The service times for the jobs (once they are picked from the queue) are independently and exponentially distributed.

Based on the workload model that forecasts the workload, and the system model that predicts performance on the forecasted workload, the tuning control estimator 590 computes necessary changes to tuning control settings to produce acceptable performance.

Figure 6:
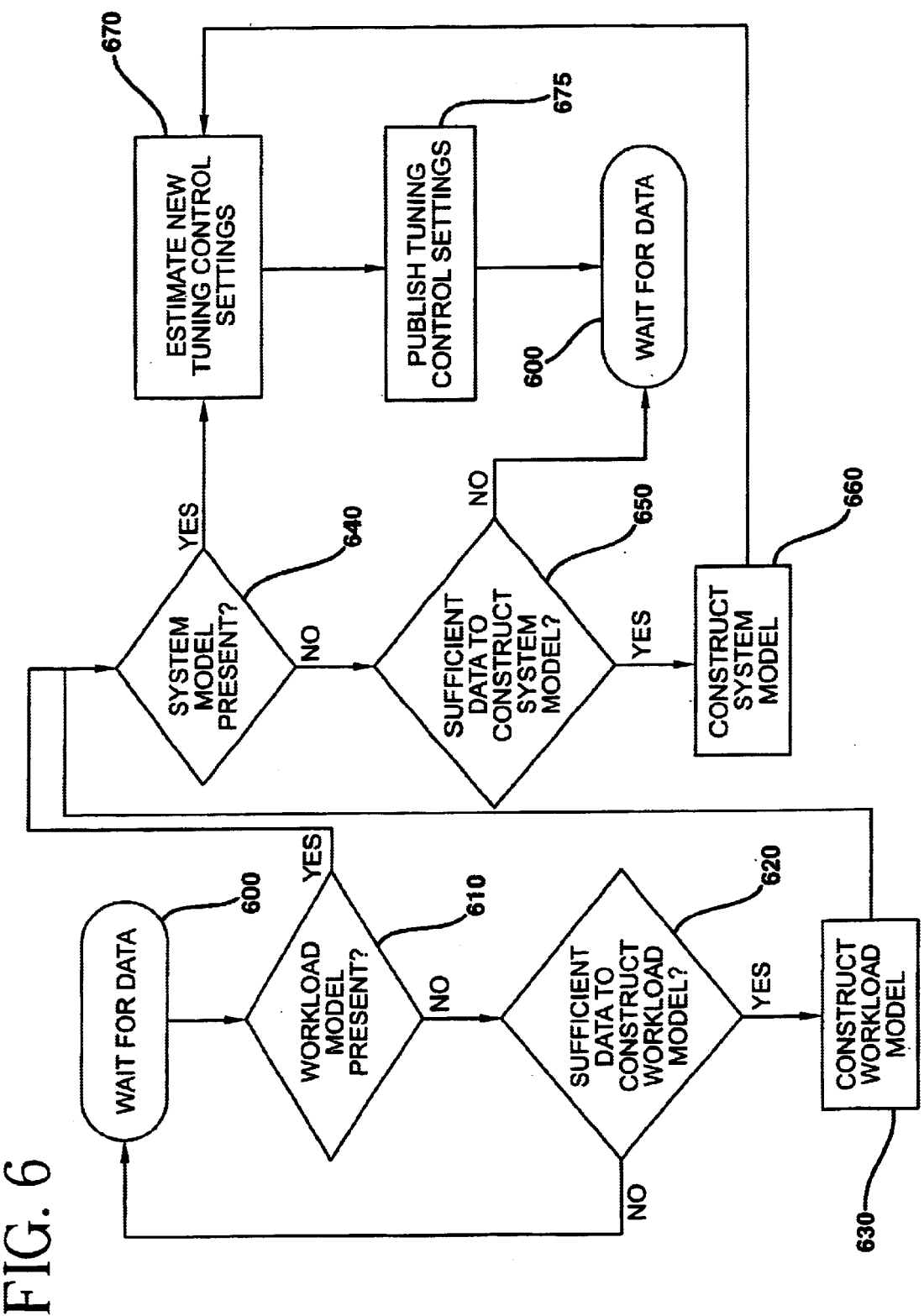
FIG. 6 is a flow diagram illustrating operation of a generic controller according to one embodiment of the present invention.

Referring now to FIG. 6, a flow diagram illustrating operation of a generic controller according to one embodiment of the present invention is shown. Specifically, details of a method used in the generic controller when a metric value is received are depicted. In step 600, the generic controller waits for data. In step 610, a test is performed to see if a workload model is present. If there is, the method proceeds to step 640. If not, then in step 620 a test is performed to see if sufficient data is present to construct a workload model. If not, the method returns to step 600. Otherwise, the model is constructed in step 630. In step 640, a test is performed to see if a system model is present. If there is, the method continues with step 670. Otherwise, in step 650, a test is performed to see if sufficient data is present to construct the system model. If not, the method returns to step 600 to wait for data. Otherwise, the controller constructs the system model in step 660 and then proceeds to step 670. In step 660, the step may be accomplished either by constructing a new system model, possibly incrementally, or by switching to a previously constructed system model. In step 670, the new tuning control settings are estimated and then, in step 675, these settings are published in the GATA repository. After step 675, the method waits for data, i.e., returns to step 600.

Figure 7:
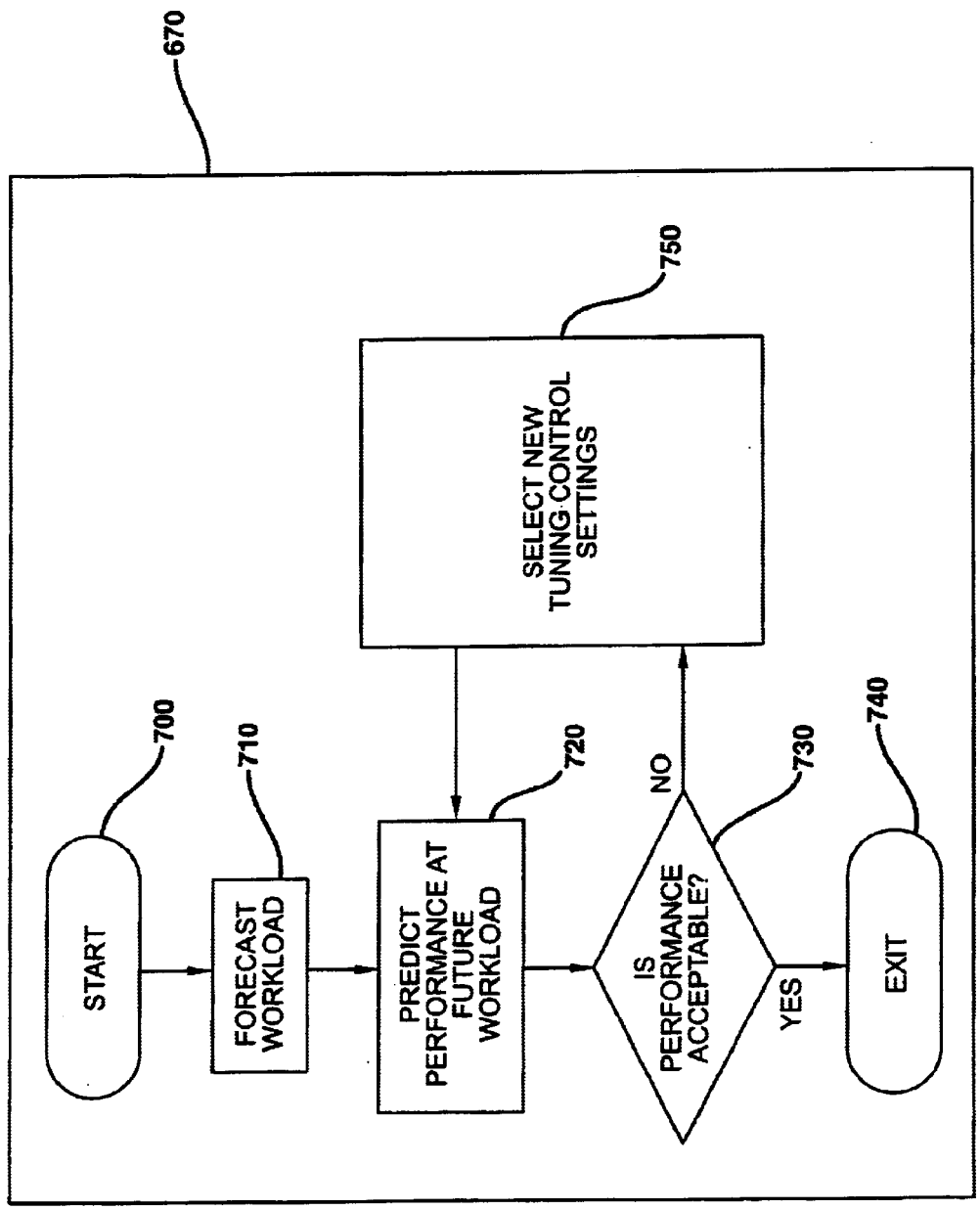
FIG. 7 is a flow diagram illustrating operation of a tuning controls estimation process according to one embodiment of the present invention.

Referring now to FIG. 7, a flow diagram illustrating operation of a tuning controls estimation process according to one embodiment of the present invention is shown. Specifically, FIG. 7 illustrates the operation of the estimate tuning control settings step 670 of FIG. 6. The method starts at block 700. First, the controller uses the workload model to forecast workloads in step 710. Then, the system model is used in step 720 to predict performance at the forecasted workload. In step 730, a test is performed to see if the result produces acceptable performance. If not, in step 750, new tuning control settings are selected and the method returns to step 720. Otherwise, the method ends at block 740.

Step 750 may be implemented in many ways. It may involve searching of possible values of tuning control settings. Alternatively, it may employ models of the controls that are known to produce good or event optimal values of control settings. One of ordinary skill in the art will appreciated many other implementations.

Figure 8:
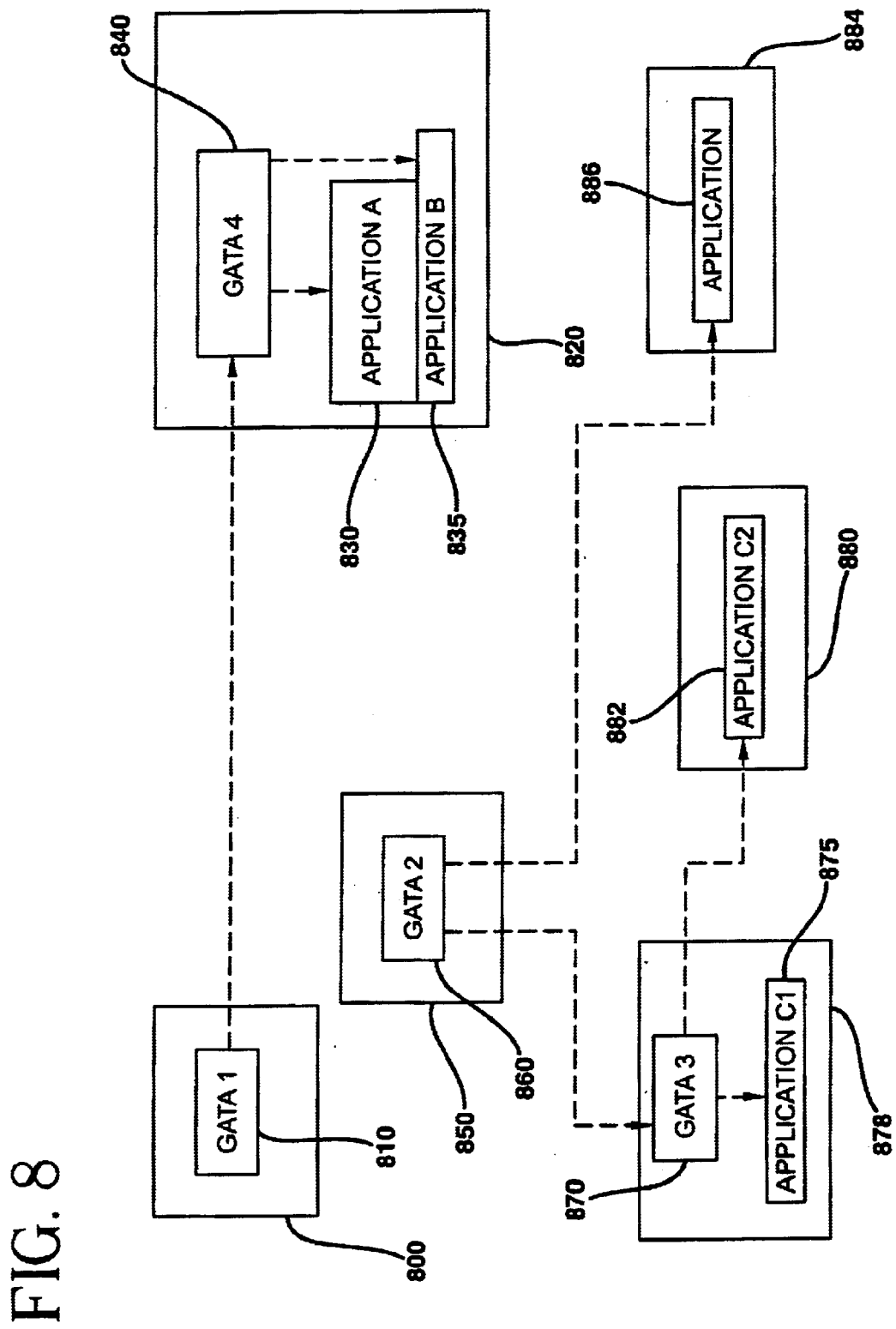
FIG. 8 is a block diagram illustrating operation of the present invention in a heterogeneous distributed environment.

Referring to FIG. 8, a block diagram is shown illustrating operation of the present invention in a heterogeneous distributed environment. System 800 has a single GATA 810 that controls other GATAs, i.e., GATA 860 in system 850 and GATA 840 in system 820. Further, GATA 840 controls multiple applications 830 and 835. GATA 860 controls two applications. The first has multiple components, namely, application C1 (875) in system 878, controlled through GATA 870, and application C2 (882) in system 880, also controlled through GATA 870. The second application 886 in system 884 comprises a single component. The arrows indicate message flow. It is obvious to one of ordinary skill in the art that messages may flow across a communications network even though the specifics of such networks are not pictured here. That is, the arrows may be considered network links such that the heterogeneous systems and applications are distributed across one or more networks. The network may be a private network or a public network, such as the Internet. The invention is not limited to any particular type of communications network.

Figure 9:
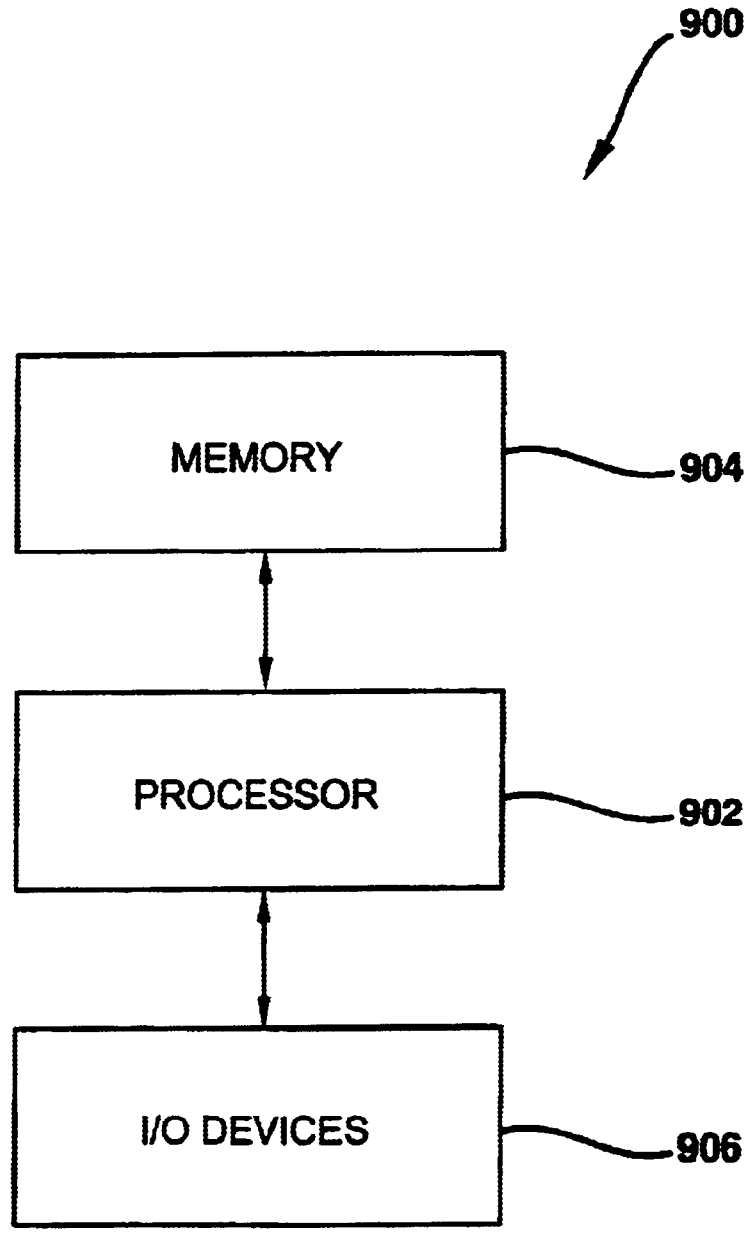
FIG. 9 is a block diagram illustrating a generalized hardware architecture of a computer system suitable for implementing a generic automated tuning agent and/or a controlled target according to the present invention.

Referring now to FIG. 9, a block diagram is shown illustrating a generalized hardware architecture of a computer system suitable for implementing the various functional components/modules of a generic automated tuning agent 105 and/or a controlled target 110, as depicted in the figures and explained in detail herein. It is to be understood that the agent 105 may be implemented on one such computer system, while the controlled target 110 is implemented on another such computer system. Of course, the agent and associated components of the controlled target, i.e., the GATA enablements, may be implemented on a single computer system. Alternatively, the processing resources of the target system, itself, may be used to implement components of the agent.

As shown, the computer system 900 may be implemented in accordance with a processor 902, a memory 904 and I/O devices 906. It is to be appreciated that the term "processor" as used herein is intended to include any processing device, such as, for example, one that includes a CPU (central processing unit) and/or other processing circuitry. The term "memory" as used herein is intended to include memory associated with a processor or CPU, such as, for example, RAM, ROM, a fixed memory device (e.g., hard drive), a removable memory device (e.g., diskette), flash memory, etc. In addition, the term "input/output devices" or "I/O devices" as used herein is intended to include, for example, one or more input devices, e.g., keyboard, for entering data to the processing unit, and/or one or more output devices, e.g., CRT display and/or printer, for presenting results associated with the processing unit. It is also to be understood that the term "processor" may refer to more than one processing device and that various elements associated with a processing device may be shared by other processing devices. Accordingly, software components including instructions or code for performing the methodologies of the invention, as described herein, may be stored in one or more of the associated memory devices (e.g., ROM, fixed or removable memory) and, when ready to be utilized, loaded in part or in whole (e.g., into RAM) and executed by a CPU.

Accordingly, systems and methods have been described above for generic automated tuning for performance management. The system comprises a target to be controlled and a generic automated tuning agent (GATA) that performs this control. The controlled target preferably provides interfaces to metrics relating to workload, service levels, and configuration information, as well as a means to adjust tuning controls that determine resource allocations within the target. The GATA preferably inputs the metrics, estimates new tuning control settings based on service objectives specified by administrators, and outputs the tuning control settings.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. Apparatus for use in automatically tuning a target in order to adjust one or more performance characteristics associated with the target, the apparatus comprising:

at least one processor operative to: (i) obtain one or more metrics associated with the target; (ii) determine one or more tuning control settings based on the one or more metrics for use in controlling the tuning of the target, the one or more tuning control settings being determined in accordance with one or more predetermined objectives and without requiring prior knowledge of performance characteristics of the target; (iii) make the one or more tuning control settings available for use in tuning the target in order to adjust the one or more performance characteristics associated with the target; and (iv) at least one of dynamically construct and change one or more models for use in tuning the target; and a memory, coupled to the at least one processor, which stores at least one of the one or more metrics and the one or more tuning control settings.

2. The apparatus of claim 1, wherein the one or more metrics associated with the target comprise at least one of workload metrics, configuration metrics and service level metrics.

3. The apparatus of claim 1, wherein the one or more predetermined objectives comprise one or more service objectives.

4. The apparatus of claim 3, wherein the one or more service objectives are set by an administrator.

5. The apparatus of claim 1, wherein the at least one processor is further operative to provide one or more interfaces with the target.

6. The apparatus of claim 5, wherein the one or more interfaces comprise one or more interfaces for obtaining the one or more metrics associated with the target.

7. The apparatus of claim 6, wherein the one or more interfaces permit access to meta data associated with the one or more metrics.

8. The apparatus of claim 7, wherein the meta data provides a classification of the one or more metrics.

9. The apparatus of claim 5, wherein the one or more interfaces comprise an interface for providing the one or more tuning control settings to the target.

10. The apparatus of claim 9, wherein the interface permits access to meta data associated with target tuning controls.

11. The apparatus of claim 10, wherein the meta data provides an indication of how a service class is affected by a directional change in a given control.

12. The apparatus of claim 1, wherein the at least one processor is further operative to obtain prior knowledge of the target for use in determining the one or more tuning control settings.

13. The apparatus of claim 1, wherein the at least one processor is further operative to obtain verifiable properties about the target for use in determining the one or more tuning control settings.

14. The apparatus of claim 1, wherein the at least one processor is further operative to construct a workload model.

15. The apparatus of claim 14, wherein the at least one processor is further operative to detect a change point in the workload model.

16. The apparatus of claim 14, wherein the at least one processor is further operative to determine whether a previously constructed workload model is no longer valid.

17. The apparatus of claim 14, wherein the at least one processor is further operative to interpret the workload model in order to forecasts changes in workloads.

18. The apparatus of claim 1, wherein the at least one processor is further operative to construct a system model.

19. The apparatus of claim 18, wherein the at least one processor is further operative to determine whether a previously constructed system model is no longer valid.

20. The apparatus of claim 18, wherein the at least one processor is further operative to detect a change point in the system model.

21. The apparatus of claim 18, wherein the system model is constructed without prior knowledge of the controlled application.

22. The apparatus of claim 18, wherein the at least one processor is further operative to determine whether the system model falls into known classes of system models and then employ a known effective controller for such classes.

23. The apparatus of claim 1, wherein the at least one processor is further operative to estimate the one or more tuning control settings based on future service levels obtained by forecasting workloads.

24. A computer-implemented method for use in automatically tuning a target in order to adjust one or more performance characteristics associated with the target, the method comprising the steps of:

obtaining one or more metrics associated with the target;

determining one or more tuning control settings based on the one or more metrics for use in controlling the tuning of the target, the one or more tuning control settings being determined in accordance with one or more predetermined objectives and without requiring prior knowledge of performance characteristics of the target;

making the one or more tuning control settings available for use in tuning the target in order to adjust the one or more performance characteristics associated with the target; and at least one of dynamically constructing and changing one or more models for use in tuning the target.

25. The method of claim 24, wherein the one or more metrics associated with the target comprise at least one of workload metrics, configuration metrics and service level metrics.

26. The method of claim 24, wherein the one or more predetermined objectives comprise one or more service objectives.

27. The method of claim 26, wherein the one or more service objectives are set by an administrator.

28. The method of claim 24, further comprising the step of providing one or more interfaces with the target.

29. The method of claim 28, wherein the one or more interfaces comprise one or more interfaces for obtaining the one or more metrics associated with the target.

30. The method of claim 29, wherein the one or more interfaces permit access to meta data associated with the one or more metrics.

31. The method of claim 30, wherein the meta data provides a classification of the one or more metrics.

32. The method of claim 28, wherein the one or more interfaces comprise an interface for providing the one or more tuning control settings to the target.

33. The method of claim 32, wherein the interface permits access to meta data associated with target tuning controls.

34. The method of claim 33, wherein the meta data provides an indication of how a service class is affected by a directional change in a given control.

35. The method of claim 24, further comprising the step of obtaining prior knowledge of the target for use in determining the one or more tuning control settings.

36. The method of claim 24, further comprising the step of obtaining verifiable properties about the target for use in determining the one or more tuning control settings.

37. The method of claim 24, further comprising the step of constructing a workload model.

38. The method of claim 37, further comprising the step of detecting a change point in the workload model.

39. The method of claim 37, further comprising the step of determining whether a previously constructed workload model is no longer valid.

40. The method of claim 37, further comprising the step of interpreting the workload model in order to forecasts changes in workloads.

41. The method of claim 24, further comprising the step of constructing a system model.

42. The method of claim 41, further comprising the step of determining whether a previously constructed system model is no longer valid.

43. The method of claim 41, further comprising the step of detecting a change point in the system model.

44. The method of claim 41, wherein the system model is constructed without prior knowledge of the controlled application.

45. The method of claim 41, further comprising the step of determining whether the system model falls into known classes of system models and then employ a known effective controller for such classes.

46. The method of claim 24, further comprising the step of estimating the one or more tuning control settings based on future service levels obtained by forecasting workloads.

47. An article of manufacture for use in automatically tuning a target in order to adjust one or more performance characteristics associated with the target, comprising a machine readable medium containing one or more programs which when executed implement the steps of:

obtaining one or more metrics associated with the target;

determining one or more tuning control settings based on the one or more metrics for use in controlling the tuning of the target, the one or more tuning control settings being determined in accordance with one or more predetermined objectives and without requiring prior knowledge of performance characteristics of the target;

making the one or more tuning control settings available for use in tuning the target in order to adjust the one or more performance characteristics associated with the target; and at least one of dynamically constructing and changing one or more models for use in tuning the target.

48. A system for automatically tuning a target in order to adjust one or more performance characteristics associated with the target, the system comprising:

generic automated tuning apparatus; and target-specific apparatus, coupled to the generic automated tuning apparatus and the target;

wherein the generic automated tuning apparatus; (i) receives one or more metrics associated with the target from the target-specific apparatus; (ii) determines one or more tuning control settings based on the one or more metrics, the one or more tuning control settings being determined in accordance with one or more predetermined objectives and without requiring prior knowledge of performance characteristics of the target; (iii) sends the one or more tuning control settings to the target-specific apparatus, wherein the target-specific apparatus uses the one or more tuning control settings to adjust the one or more performance characteristics associated with the target; and (iv) at least one of dynamically constructs and changes one or more models for use in tuning the target.

49. The system of claim 48, wherein the target is another generic automated tuning apparatus.

50. The system of claim 48, wherein the system is implemented in a distributed network.

* * * * *